United States Patent
Pulkka

(10) Patent No.: US 7,720,048 B2
(45) Date of Patent: May 18, 2010

(54) CHANNEL ALLOCATION IN A NETWORK ELEMENT BETWEEN AT LEAST TWO NETWORKS

(75) Inventor: Pekka Pulkka, Oulu (FI)

(73) Assignee: Nokia Corporation, Espoo (FI)

( * ) Notice: Subject to any disclaimer, the term of this patent is extended or adjusted under 35 U.S.C. 154(b) by 1309 days.

(21) Appl. No.: 10/297,764

(22) PCT Filed: Apr. 11, 2001

(86) PCT No.: PCT/FI01/00363

§ 371 (c)(1),
(2), (4) Date: Jul. 14, 2003

(87) PCT Pub. No.: WO01/95607

PCT Pub. Date: Dec. 13, 2001

(65) Prior Publication Data

US 2004/0017799 A1    Jan. 29, 2004

(30) Foreign Application Priority Data

Jun. 9, 2000    (FI) .................................. 20001382

(51) Int. Cl.
*H04L 12/66* (2006.01)
(52) U.S. Cl. ..................... 370/352; 370/360; 370/401; 370/431
(58) Field of Classification Search ................. 370/362, 370/401, 360, 357, 351, 431, 458
See application file for complete search history.

(56) References Cited

U.S. PATENT DOCUMENTS

| | | | |
|---|---|---|---|
| 4,716,562 A * | 12/1987 | Carse et al. ................. | 370/294 |
| 4,897,874 A | 1/1990 | Lidinsky et al. | |
| 6,215,790 B1 | 4/2001 | Voit et al. | |
| 6,229,810 B1 * | 5/2001 | Gerszberg et al. ........... | 370/401 |
| 6,347,091 B1 * | 2/2002 | Wallentin et al. ........... | 370/437 |
| 6,452,924 B1 * | 9/2002 | Golden et al. ............... | 370/352 |
| 6,466,573 B1 * | 10/2002 | Renucci ...................... | 370/352 |
| 6,512,762 B1 * | 1/2003 | Renucci et al. ............. | 370/352 |
| 6,614,758 B2 * | 9/2003 | Wong et al. ................. | 370/232 |
| 6,754,181 B1 * | 6/2004 | Elliott et al. ................ | 370/252 |
| 6,856,613 B1 * | 2/2005 | Murphy ...................... | 370/352 |
| 6,868,080 B1 * | 3/2005 | Umansky et al. ........... | 370/354 |
| 7,184,430 B2 * | 2/2007 | Schessel ..................... | 370/352 |
| 7,359,402 B2 * | 4/2008 | Gardner et al. ............. | 370/468 |

(Continued)

FOREIGN PATENT DOCUMENTS

WO    WO 00/30335    5/2000

*Primary Examiner*—Ayaz R Sheikh
*Assistant Examiner*—Mounir Moutaouakil
(74) *Attorney, Agent, or Firm*—Mintz, Levin, Cohn, Ferris, Glovsky, and Popeo, P.C.

(57) ABSTRACT

This invention relates to the allocation of communication channels. The idea of the invention is to form different channel groups with a group specific identifier in the IP network side of a network element between a PSTN and IP network. Each group represents a certain type of channel, for example, alarm calls, area codes, companies, etc. The PSTN network side of the net-work element forms a single group due to the need of a unique SPC. A channel is associated with the right group according to the information of the calling or called party in the call signaling, such as an E.164 number or a signaling IP address. The information is linked to the group identifier.

19 Claims, 4 Drawing Sheets

U.S. PATENT DOCUMENTS

| | | | |
|---|---|---|---|
| 2001/0028642 A1* | 10/2001 | Veschi | 370/352 |
| 2001/0046209 A1* | 11/2001 | Glassman | 370/230 |
| 2002/0114349 A1* | 8/2002 | Glass et al. | 370/466 |
| 2004/0151194 A1* | 8/2004 | Cannon et al. | 370/401 |
| 2005/0103190 A1* | 5/2005 | Puryear | 84/626 |
| 2005/0122985 A1* | 6/2005 | Murphy | 370/401 |
| 2006/0034265 A1* | 2/2006 | Thompson | 370/352 |

* cited by examiner

| GROUP IDENTIFIER | IP ADDRESS |
|---|---|
|  |  |
|  |  |
|  |  |
|  |  |
|  |  |
|  |  |
|  |  |
|  |  |
|  |  |
|  |  |
|  |  |
|  |  |
|  |  |
|  |  |
|  |  |

CHANNEL ALLOCATION IN A NETWORK ELEMENT BETWEEN AT LEAST TWO NETWORKS

FIELD OF THE INVENTION

This invention relates to the allocation of communication channels. In particular, the invention relates to the allocation of communication channels in a network element between a PSTN network and IP network.

BACKGROUND OF THE INVENTION

Channel connections between a PSTN and IP network can be divided into two parts: signaling channel connections and payload channel connections. The network element, called gateway, between the PSTN and the IP network comprises a control part and a cross-connection part. The control part, which can be a separate element from the network element, receives the signaling, called SS7, from the PSTN network, converts it to the signaling used in the IP network, for example H.323, and vice versa. The control part also controls operations in the cross-connection part. The cross-connection part reserves and connects payload channels from PCM time-slots (a PSTN network) to IP packet streams (an IP network) and vice versa.

The control part has a unique SPC (Signaling Point Code) number for the needs of the SS7 signaling. Due to this, there is one control part per a cross-connection part. The cross-connection part of the gateway can also be divided into several units, each unit including a portion of the PSTN and IP channels. Each unit needs a separate control part. So, for example, a gateway with three cross-connection units needs three control parts. However, sometimes there are needs, such as cost-saving and maintenance, for using several cross-connection units under one control part. The objective of the invention is to make it, possible. This is achieved in a way described in the claims.

SUMMARY OF THE INVENTION

The idea of the invention is to form different channel groups with a group specific identifier in the IP network side of a network element between a PSTN and IP network, which can be a media gateway converting communication channels provided in one type of network to the format required in another type of network. Each group represents a certain type of channel, for example, alarm calls, area codes, companies, etc. The PSTN network side of the network element forms a single group due to the need of a unique SPC. A channel is associated with the right group, for example using a table, according to the information of the calling or called party in the call signaling, such as an E.164 number or a signaling IP address. The information is linked to the group identifier. The groups with identifiers make it possible to do a variety of control and management tasks, such as allocating channel resources. It is worth noting that the groups can overlap with each other. The control part of the gateway uses the group identifier for controlling the payload channels in group level matters. The control part uses an Add command for transmitting a group identifier information to the cross-connection part.

In other words, the invention covers an arrangement for allocating communication channels in the network element between a PSTN network and an IP network, which element comprises a control part and a cross-connection part, so that the channels on the IP network side of the network element are arranged into several groups, which are provided with group-specific identifiers for identifying the groups to where the channels are allocated.

BRIEF DESCRIPTION OF THE DRAWINGS

In the following the invention is described in more detail by means of FIGS. 1-6 in the attached drawings where.

DETAILED DESCRIPTION OF THE INVENTION

Figure 1:
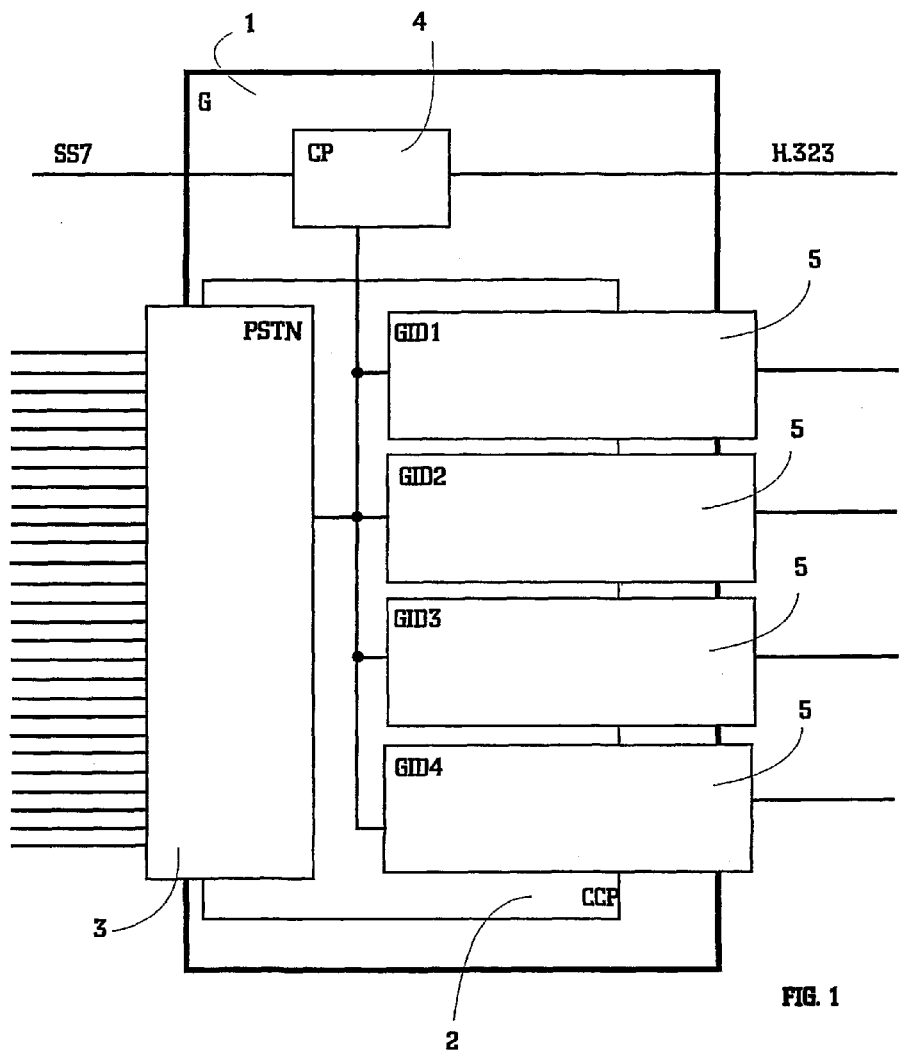
FIG. 1 illustrates an example of the gateway according to the invention.

FIG. 1 depicts the gateway G (1) according to the invention. The cross-connection part CCP (2) is divided into several groups. The PSTN side (3) forms a single group because the demand is to use only one control part CP (4), and due to that there is only one SPC in use. Each PSTN group must have a unique SPC. Actually, the SPC identifies the control part, which controls the PSTN group. The IP side is divided into four groups (5). Each group has its own group identifier (GIDx) that is used when the group is to be controlled or managed. The control part has interfaces to SS7 signaling and the packet signaling used, for example H.323. The control part handles reservations and connections between PSTN and IP channels.

Figures 2, 4:
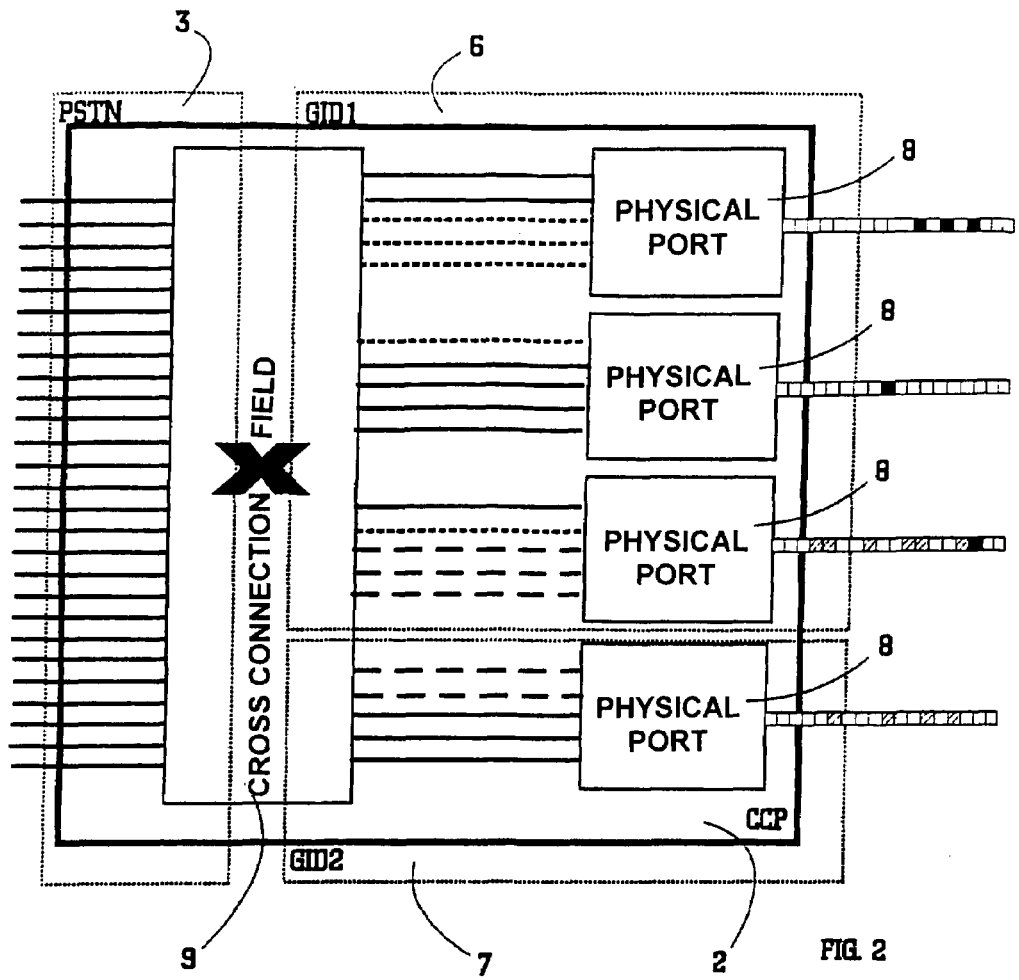
FIG. 2 depicts different ways to group channels.
FIG. 4 illustrates a table that associates group identifiers with IP addresses.

Criteria for making the division of channels into separate groups can be any kind, depending on the demands of operators, customers, managing etc. For example, an area code, a company (customer), an alarm call, or network element information can be the basis for channel allocation into the groups. The operator can use the groups for billing, allocating resources, monitoring etc. FIG. 2 shows an example of two criteria for the division of channels. The first criterion is area codes in which case there has been made two groups in the IP part: the urban area (6) and suburban area (7). The urban area contains three separate districts, and to each district there is a physical port (8) in the cross-connection part. The suburban area contains one physical port. The second criterion is a division into companies (customers). There are three companies under the gateway. The channels which have been allocated to the first company are depicted in the black lines between the cross-connection field (9) and the physical ports, the second company in the dense short dashed lines, and the third company in the separated long dashed lines. In this case it is worth noting that the division does not have to be based on the physical structures, but it can be based on any criterion desired, and a group can be formed from the channels spread over several physical networks (several physical ports). Another matter worth noting is that there can be several overlapping criteria for the division of the group, as the situation is in FIG. 2.

To facilitate control of the groups, there must be a way to find the right group. The solution is to use a group identifier for identifying the group. A table (FIG. 4), forming a file of groups, makes it possible to associate group identifiers and IP addresses, for example. Each group represents a certain criterion, such as area code, company, or network element. The criterion used is totally a choice of the user. It is worth noting that an IP address (or E.164 number, or another address type) of the calling or called party can contain the criterion, such as a certain area of the network.

Both the cross-connection part and the control part must have means to maintain the file of groups. There must also be a way to transmit the group identifier information between the cross-connection part and the control part.

Figure 3:
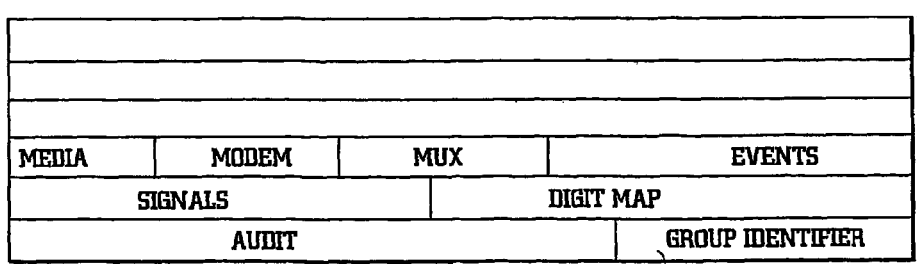
FIG. 3 shows a group identifier inside a message between a control and cross-connection part.

The interface used between the cross-connection part and the control part is H.248, for example. A modification must be made to the interface used for the group identifier. H.248 comprises an Add command that creates a connection between two channels. Adding a new optional field into the Add command makes it possible to send the group identifier between the cross-connection part and the control part. FIG. 3 depicts the group identifier field (10) in the Add command. The Header of the Add command field comprises the initial information from the connection. The Media field specifies the parameters for all media streams in the connection. The Modem field identifies the modem type and properties when applicable. The Mux field describes the multiplex type. The Events field shows events to be detected by the cross-connection part and what to do when an event is detected. The Signals field describes signals and/or actions to be applied. The Digit Map field contains instructions for handling DTMF tones, and the Audit field identifies which information is to be audited. Finally, the Group Identifier field identifies the right group.

Figure 5:
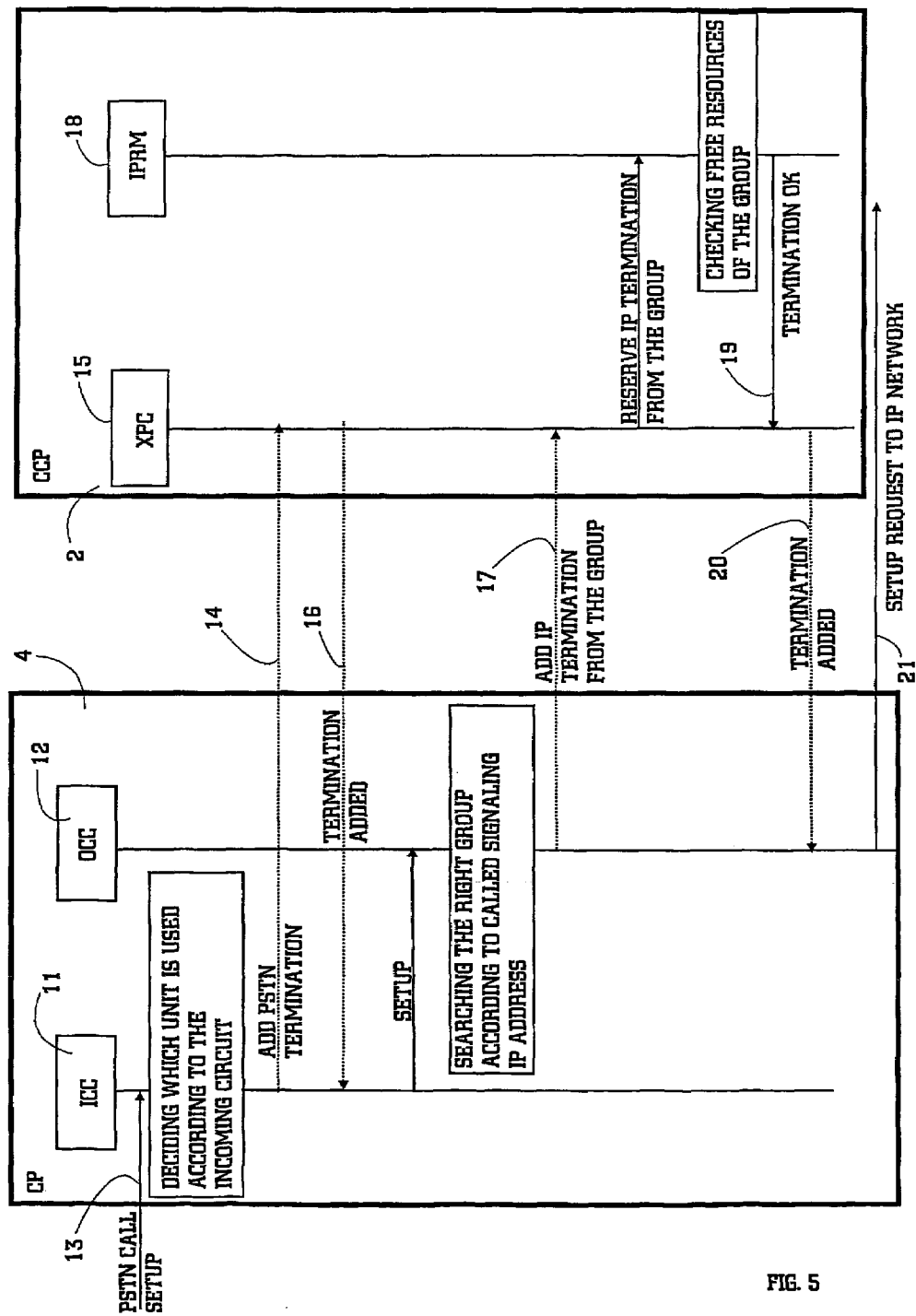
FIG. 5 illustrates how an incoming PSTN call is directed to the right group.

FIG. 5 represents an example of how an incoming PSTN call is directed to the right group. The control part (4) comprises two functional blocks: ICC (Incoming Call Control) (11) and OCC (Outgoing Call Control) (12). The ICC handles the terminations of PSTN lines. A termination means either one timeslot in the PSTN side of the element or a packet stream in the IP side, i.e. a termination means a channel in one side of the network element. In other words, a termination means the relevant timeslot and/or packet stream in the cross-connection field to where an input channel is directed.

Certain tasks are needed when a call comes in or goes out, such as a circuit reservation in the cross-connection field. The OCC handles terminations in the IP side and transfers calls out from the gateway. After receiving the signaling of the incoming call (13), the ICC decides which cross-connection unit is used. The control part can be a separate element from the gateway as mentioned before. And the cross-connection part (CCP) (2) can comprise several cross-connection units. The right cross-connection unit depends on the circuit of an incoming call. After the decision, the ICC sends a termination request (14) to the cross-connect-controller (XPC) (15), which sends an acknowledgment message (16) back after the termination has been reserved. The messages between the control part and the cross-connection part have been marked in dashed lines. The actions of the PSTN side are finished now, and the ICC is ready to transfer the call setup to the OCC. The OCC searches for the right group according to the called signaling IP address using the table according to FIG. 4. After finding the group, the OCC sends a termination request (17) of the IP side containing the group identifier to the cross-connection-controller. This termination uses the resources of the found group. The cross-connection part also contains the IPRM (IP resource manager) (18) to whom the cross-connect-controller transfers the termination request of the IP side. The IPRM checks that there are free resources in the group. After successfully checking and reserving the resource in the group, the IPRM sends a termination OK message (19) to the cross-connect-controller, which performs the needed actions and informs (20) the OCC that the termination has been reserved. The OCC is now ready to transfer (21) the call setup to the IP network.

Figure 6:
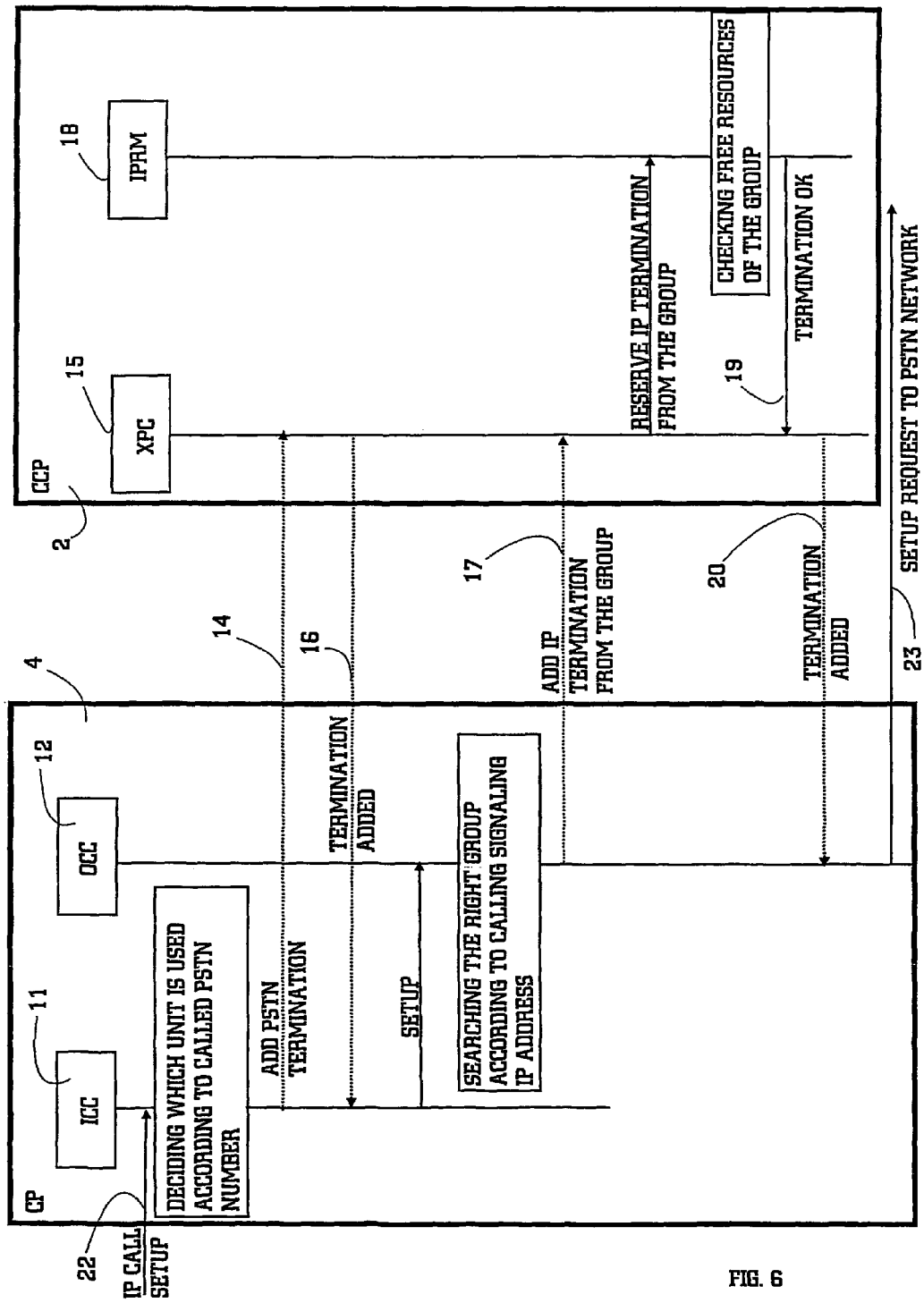
FIG. 6 illustrates how an incoming IP call is directed to the right group.

Correspondingly, FIG. 6 depicts an example of how the signaling of the incoming IP call (22) is directed to the right group. After receiving the incoming call setup, the ICC decides which cross-connection unit is used. The right cross-connection unit depends on the called PSTN number. After the decision, the ICC sends a termination request (14) to the cross-connect-controller (15), which sends an acknowledgment message (16) back after the termination is reserved. The actions of the PSTN side are finished now, and the ICC is ready to transfer the call setup to the OCC. The OCC searches for the right group according to the calling signaling IP address. After finding the group, the OCC sends a termination request (17) of the IP side containing the group identifier to the cross-connection-controller. This termination uses the resources of the found group. The cross-connect-controller transfers the termination request to the IPRM (18). The IPMR checks that there are free resources in the group. After successfully checking and receiving the resource in the group, the IPRM sends a termination OK message (19) to the cross-connect-controller, which performs the needed actions and informs (20) the OCC the termination has been reserved. The OCC is ready to transfer (23) the call setup to the PSTN network.

A group division can be configured to the gateway (to the control and cross-connection part) from the network management, or the gateway already has the group division when implementing. Network management has a possibility to change the group division and monitor the groups through a management interface.

The invention makes it possible to use only one control part per several controllable and manageable groups. That means cost-savings and business-like network planning for an operator. The groups are easy to control and manage and so it is easy to address and monitor channels with a desired feature. It is clear that the invention is not restricted to the abovementioned implementation, but it can be used in other solutions as well, in the scope of the inventive idea.

The invention claimed is:

1. An apparatus, comprising:
a controller; and
a cross-connector coupled to the controller and disposed between a public switched telephone network and an internet protocol network, and
wherein communication channels on the internet protocol network side of the apparatus are configured into a plurality of groups, the plurality of groups are provided with group-specific identifiers used to identify assignment of the channels to the groups, and
wherein a calling party or called party provides call signaling information which comprises at least one group-specific identifier designating which group will be assigned the channel used to route a call, and at least one of the cross-connector and the controller maintain group information and communicate the group information between each other,
wherein the controller and the cross-connector are configured to use a control channel for conducting intercommunications, and the incoming communication channel is configured to carry an add command, and
wherein the controller and the cross-connector are configured to use an optional field in an add command for carrying a group identifier.

2. The apparatus according to claim 1, wherein the apparatus comprises a media gateway configured to convert the communication channels provided in a first type of network to a format required in a second type of network.

3. The apparatus according to claim 1, wherein a plurality of overlapping groups are formed, and
wherein at least one of the communication channels is assigned as a member of several groups.

4. The apparatus according to claim 1, wherein the communication channels associated with the public switched telephone network of the apparatus are configured into a single group.

5. The apparatus according to claim 1, wherein the plurality of the groups are controlled by the control part.

6. The apparatus according to claim 5, wherein the control part searches for a correct group for an incoming communication channel,
and wherein the incoming communication channel is transmitted from the public switched telephone network.

7. The apparatus according to claim 5, wherein the control part searches for a correct group for an incoming communication channel,
and wherein the incoming communication channel is transmitted from the internet protocol network.

8. The apparatus according to claim 1, wherein the plurality of groups are managed by a network management.

9. The apparatus according to claim 1, wherein the the communication channels are based on area codes of the communication channels.

10. The apparatus according to claim 1, wherein the communication channels is based on customers of the communication channels.

11. The apparatus according to claim 1, wherein the communication channels separates alarm calls into defined groups.

12. The method according to claim 1, wherein a plurality of overlapping groups are formed, and
wherein at least one of the communication channels is assigned as a member of several groups.

13. The method according to claim 1, wherein the communication channels associated with the public switched telephone network of the network element are arranged into a single group.

14. The method according to claim 1, wherein the plurality of groups are managed by a network management.

15. The method according to claim 1, wherein the communication channels are based on area codes of the communication channels.

16. The method according to claim 1, wherein the communication channels are based on customers of the communication channels.

17. The method according to claim 1, wherein the communication channels separates alarm calls into defined groups.

18. A method, comprising:
searching for a desired group for an incoming communication channel;
checking resources of the desired group;
reserving a capacity in the desired group if there is enough capacity to reserve; and
after reserving the capacity, reserving a connection for the incoming communication channel in a network element, wherein
the method being for allocating communication channels in the network element between a public switched telephone network and an internet protocol network, to form a plurality of manageable groups of internet protocol channels located on the internet protocol network side, wherein the plurality of manageable groups are used when an incoming communication channel is directed to a correct group, and
wherein a calling party or called party provides call signaling information which comprises at least one group-specific identifier designating which group will be assigned the channel used to route a call, and at least one of a cross-connector and a controller maintain group information and communicate the group information between each other,
wherein the control part and the cross-connection part are configured to use a control channel for conducting intercommunications, and the incoming communication channel is configured to carry an add command, and
wherein the control part and the cross-connection part are configured to use an optional field in the add command for carrying a group identifier.

19. The method according to claim 18, wherein the network element comprises a media gateway configured to convert the communication channels provided in a first type of network to a format required in a second type of network.

* * * * *

UNITED STATES PATENT AND TRADEMARK OFFICE
CERTIFICATE OF CORRECTION

PATENT NO. : 7,720,048 B2 Page 1 of 1
APPLICATION NO. : 10/297764
DATED : May 18, 2010
INVENTOR(S) : Pekka Pulkka It is certified that error appears in the above-identified patent and that said Letters Patent is hereby corrected as shown below:

On the Title page,

Please change the filing date from July 14, 2003 to: July 17, 2003

Signed and Sealed this

Twelfth Day of October, 2010

David J. Kappos
*Director of the United States Patent and Trademark Office*